United States Patent
Grehl et al.

(10) Patent No.: US 6,475,449 B2
(45) Date of Patent: Nov. 5, 2002

(54) METHOD FOR EXTRACTING OSMIUM AND RUTHENIUM FROM NOBLE METAL CONCENTRATES

(75) Inventors: Matthias Grehl, Frankfurt; Horst Meyer, Altenstadt; Dieter Schäfer, Münzenberg, all of (DE)

(73) Assignee: W.C. Heraeus GmbH & Co. KG, Hanau (DE)

( * ) Notice: Subject to any disclaimer, the term of this patent is extended or adjusted under 35 U.S.C. 154(b) by 73 days.

(21) Appl. No.: 09/754,515

(22) Filed: Jan. 4, 2001

(65) Prior Publication Data
US 2001/0006612 A1 Jul. 5, 2001

(30) Foreign Application Priority Data
Jan. 5, 2000 (DE) .......................................... 100 00 274

(51) Int. Cl.$^7$ ............................................. C22B 11/00
(52) U.S. Cl. ...................................................... 423/22
(58) Field of Search ............................................. 423/22

(56) References Cited

U.S. PATENT DOCUMENTS 4,105,442 A * 8/1978 Fieberg et al. ................. 423/22

FOREIGN PATENT DOCUMENTS

JP 64-000233 * 1/1989

OTHER PUBLICATIONS

Chem. abstract 92 (1980) Ref.Nr. 157222 W, no month.

* cited by examiner

Primary Examiner—Steven Bos
(74) Attorney, Agent, or Firm—Norris McLaughlin & Marcus

(57) ABSTRACT

A method for extracting osmium and ruthenium from noble metal concentrates, by:

a) treatment of a noble metal concentrate containing osmium and ruthenium with nitric acid at a maximum temperature of about T=+30° C., b) heating of the resultant suspension/solution to a minimum temperature of about T=+85° C.;

c) capturing the resultant osmium tetroxide in an absorption solution;

d) treatment of the suspension/solution having a temperature of about T=+20° C. to 30° C. with hydroxide at a maximum reaction temperature of about T=+65° C.; and e) treatment of the alkaline suspension/solution from step d) with a substance for the oxidizing leaching of the ruthenium.

9 Claims, No Drawings

METHOD FOR EXTRACTING OSMIUM AND RUTHENIUM FROM NOBLE METAL CONCENTRATES

The invention relates to a method for extracting osmium and ruthenium from noble metal concentrates.

In Chem. Abstr. 92 (1980) Ref. No. 157222 W, a method is disclosed for the extraction of osmium and ruthenium from platinum alloys containing these elements, in which the alloy is treated with nitric acid and the resultant solution is heated such that osmium tetroxide gasses out.

The process for extracting ruthenium and osmium from ore concentrate, which is known in the state of the art and is in general use, is as follows:

First the ore concentrate is subjected to an alkalinely oxidizing fusion by means of hydroxide and then ruthenium and osmium are precipitated with ethanol. The solid phase is again decomposed with an alkalinely oxidizing fusion and dissolved. Ruthenium is distilled out and captured with an absorption solution containing hydrochloric acid. Then the absorption solution is concentrated in a circulating evaporator and osmium is then distilled out by means of $H_2O_2$, while ruthenium chloride remains in the liquid phase. The recovered osmium tetroxide is absorbed in an alkaline absorber, precipitated as a sulfide, the precipitate is separated from the liquid phase, melted with alkaline oxidation, and lastly distilled out as osmium tetroxide by adding hydrochloric acid, then absorbing in an alkaline absorber, filtering out after alcohol precipitation, and finally reduced with hydrogen to the pure osmium.

This process involves a number of sometimes time-consuming and therefore expensive steps and in many cases the osmium yield leaves much to be desired.

For this reason the problem arises of at least partially removing the above-stated disadvantages by means of a novel method for the extraction of osmium and ruthenium from noble metal concentrates, and especially to offer a cost-effective and less complicated process with a higher osmium yield.

In the process of the invention, first a noble metal concentrate containing osmium and ruthenium is treated with nitric acid at a maximum temperature of about $T=30°$ C., and then the suspension/solution is heated to a minimum temperature of about $T=85°$ C. The osmium tetroxide thus developing is collected in an absorption solution (this is a hydroxide solution), while thereafter the remaining suspension/solution freed of osmium and having a temperature of about $T=20°$ C. to $30°$ C. is treated with hydroxide at a maximum reaction temperature of about $T=65°$ C. The suspension/solution is alkalinized. Finally it is treated with an agent for the oxidative extraction of the ruthenium, for example by passing chlorine gas through it while a hypochlorite solution oxidizing the ruthenium forms simultaneously.

After the alkaline oxidative extraction an insoluble solid remains, which still contains a small amount of ruthenium. This residue is separated from the ruthenate solution by letting it settle and decanting it.

It is advantageous if, in capturing the osmium tetroxide a KOH absorption solution is used, since excellent results are found when the osmium is then precipitated.

Furthermore, it is advantageous if, when treating the suspension/solution with hydroxide the latter is added slowly and/or in portions to the suspension/solution in order to assure a controlled neutralization reaction at a not too high temperature (namely not higher than about $T=65°$ C.).

Furthermore, it has proven advantageous for the absorption solution to be treated with ethanol after colleting the osmium tetroxide such that the resultant absorption-ethanol solution has a maximum ethanol content of about 5% by volume, since then the absorption and precipitation properties can be considered optimal.

Furthermore, it is advantageous if, after the absorption of the osmium tetroxide, ethanol is added in portions to the absorption solution, since this procedure results in optimal precipitation and a low residual osmium content.

For the further reduction of the residual osmium content it is advantageous if the absorption solution is stirred during and after the addition of ethanol.

It is furthermore advantageous if the suspension/solution is made alkaline with solid NaOH, since in this manner a definitely lower increase in volume results. The addition of solid NaOH takes place advantageously at a temperature of about $T=30°$ C. to about $T=65°$ C., since thus a very large percentage of ruthenium can be activated and dissolved out.

Lastly, it is especially advantageous for the oxidative recovery of the ruthenium if hypochlorite or peroxodisulfate is used, since in this way a greater oxidant yield can be achieved in comparison to the classical introduction of chlorine gas into a hydroxide solution, while avoiding the formation of oxygen.

The following example serves to explain the invention.

Example of the application of osmium distillation and ruthenium leaching

Input Material 291.2 kg of dried and ground residue from Os/Ru alcohol precipitation.

Apparatus 800 liter enameled steel vat

Absorption apparatus consisting of two fifty-liter absorbers filled with 45 liters KOH (25%) each and water jet pump for pumping the gas phase.

Description of the Process

The residue was processed in 3 portions of about 100 kg each.

1. Osmium distillation

The condensate (approx. 120 liters) and approximately 50 liters of VE water from the preceding distillation were placed in the reaction vat and then about 100 kg of residue was aspirated into the vat. The vat was sealed and the gas circulation turned on. At room temperature, 100 liters of 52% nitric acid was pumped in within 30 minutes. Then the vat was heated to about 85° C. and the osmium was distilled off in about 10 hours. The $OsO_4$ was absorbed in KOH (25%) in the absorption apparatus.

2. Ruthenium leaching

The suspension was cooled to about 30° C. and 75 kg of solid sodium hydroxide was added portion-wise, with cooling. The rate of addition was chosen so that the temperature did not exceed 65° C. Then the suspension was cooled again, and sodium hypochlorite solution (approx. 2 mol/l) was added at about 30° C. until the suspension definitely foamed up (about 150 to 180 liters of NaOCl solution). Stirring continued for 4 hours and then the ruthenate solution was pumped into a strainer box.

3. Osmate precipitation

After each distillation the first absorber was emptied and filled with fresh 25% KOH. The second absorber was substituted only after every second Os distillation. The osmate solution was combined into greater portions. After the entire residue had been processed, the absorber solution (about 200 liters) was treated portion-wise with 10 liters of denatured ethanol. The mixture was stirred until a violet residue formed and the supernatant solution was clear. The residue was let settle overnight, the supernatant solution was decanted, the residue was filtered and washed with 3 liters of denatured ethanol and suctioned dry. The potassium osmate was weighed and passed on for osmium purification.

Evaluation
Osmium balance

| | 1.1 Analysis Results | | 1.1.1.1 Balancing | |
|---|---|---|---|---|
| | Residue | Potassium osmate | Residue | Potassium osmate |
| Quantity | 291.2 kg | 7,800 g | Input amount absolute | Amount with respect to input |
| Osmium | 1.49% | 4,463 g | 4,200 g | 97.3% |

Ruthenium balance

| | 1.1.1.2 Analysis results | | 1.1.1.3 Balancing | |
|---|---|---|---|---|
| | Residue | Ruthenate solution Parts 1–3 | Residue | Ruthenate solution Parts 1–3 |
| Amount | 291.2 kg | 1,830 l | Input absolute | Amount with respect to input |
| Ruthenium | 17.44% | 24.3 g/l* | 50.8 kg | 87.5% |

*Solution separated from the solid by settling.

What is claimed is:

1. Method for the extraction of osmium and ruthenium from noble metal concentrates containing osmium and ruthenium wherein a) nitric acid is added to the noble metal concentrate at a maximum temperature of 30° C. and the resultant suspension/solution heating to a minimum temperature of 85° C. to form osmium tetroxide, b) the osmium tetroxide is collected in an absorption solution, c) the suspension/solution now free of osmium tetroxide id cooled to a temperature of 20° C. to 30° C. and a hydroxide is added while maintaining the temperature at a maximum of about 65° C., to adjust the suspension/solution to an alkaline pH, and d) the alkaline suspension/solution from c) is treated with a substance for the oxidative extraction of the ruthenium and formation of a ruthenate solution.

2. Method according to claim 1, wherein said absorption solution is a KOH.

3. Method according to claim 1, wherein in c) the hydroxide is added at a controlled rate or in portions to the suspension/solution.

4. Method according to claim 1, wherein, after the absorption of osmium tetroxide, ethanol is added to the absorption solution to a maximum ethanol content of 5 vol. % in the absorption solution.

5. Method according to claim 4, wherein the ethanol is added to the absorption solution in portions.

6. Method according to claim 5, wherein the absorption solution is stirred during and after the addition of ethanol.

7. Method according to claim 1, wherein said hydroxide is solid NaOH.

8. Method according to claim 7, wherein the addition of solid NaOH is performed at a temperature of about 30° C. to about 65° C.

9. Method according to claim 1, wherein said substance for the oxidate extraction of the ruthenium is a hypochlorite or peroxodisulfate.

* * * * *

UNITED STATES PATENT AND TRADEMARK OFFICE
CERTIFICATE OF CORRECTION

PATENT NO. : 6,475,449 B2
DATED : November 5, 2002
INVENTOR(S) : Matthais Grehl et al.

It is certified that error appears in the above-identified patent and that said Letters Patent is hereby corrected as shown below:

<u>Title page,</u>
Item [56], References Cited, U.S. PATENT DOCUMENTS add;
-- 4,390,366     6-28-83          Lea et al.   75   101 --

OTHER PUBLICATIONS add:
-- English Translation of Derwent Abstract of SU 1784034 AD (12/23/92) DW 199403 --

<u>Column 4,</u>
Line 7, change "id" to -- is --

Signed and Sealed this

First Day of April, 2003

JAMES E. ROGAN
*Director of the United States Patent and Trademark Office*